(No Model.) 2 Sheets—Sheet 1.

A. E. PEYRUSSON.
SECONDARY BATTERY OR ACCUMULATOR.

No. 368,608. Patented Aug. 23, 1887.

Witnesses:
John M. Speer
Harry M. Smk

Inventor:
A. E. Peyrusson
by his attorneys
Bresen & Steele (No Model.) 2 Sheets—Sheet 2.
A. E. PEYRUSSON.
SECONDARY BATTERY OR ACCUMULATOR.
No. 368,608. Patented Aug. 23, 1887.
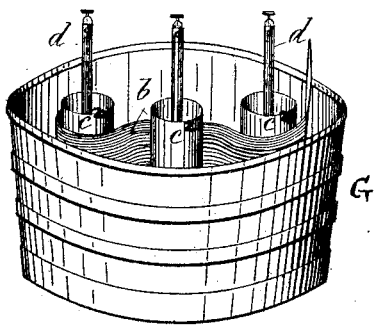
FIG. 4.ᵃ
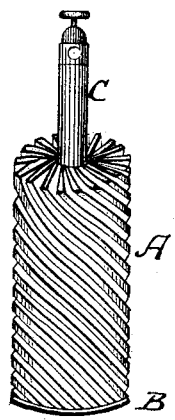
FIG. 3.ᵃ
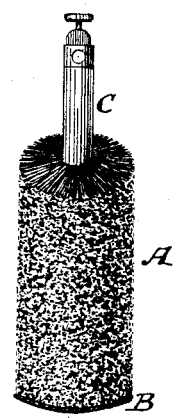
FIG. 2.ᵃ
Witnesses:
A. Schehl
Hanym. ...
Inventor:
Antoine E. Peyrusson
by Briesen & Steele
Attorneys.

UNITED STATES PATENT OFFICE.

ANTOINE EDOUARD PEYRUSSON, OF LIMOGES, FRANCE.

SECONDARY BATTERY OR ACCUMULATOR.

SPECIFICATION forming part of Letters Patent No. 369,608, dated August 23, 1887.

Application filed March 19, 1886. Serial No. 195,814. (No model.)

*To all whom it may concern:*

Be it known that I, ANTOINE EDOUARD PEYRUSSON, of the city of Limoges, France, have invented new and useful Improvements in Secondary Batteries or Accumulators, of which the following is a full, clear, and exact description.

Figure 1:
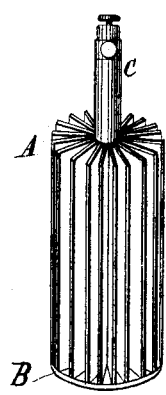
Figure 3:
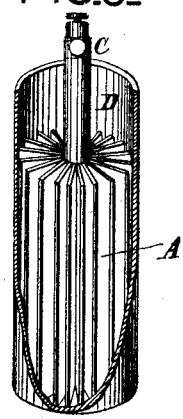
Figure 2:
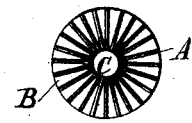
Figure 4:
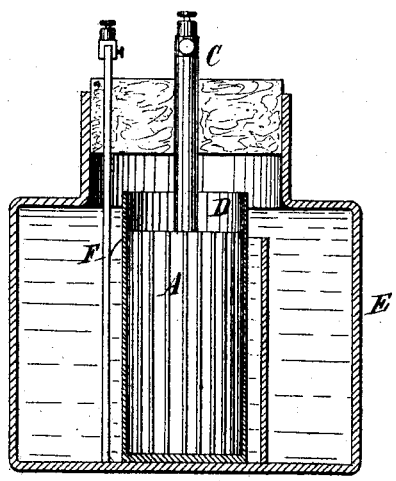

Figure 1 is a perspective view of the electrode. Fig. 2 is a top view of same. Fig. 3 is a sectional elevation of a vase containing said electrode. Fig. 4 is a sectional elevation of said vase when contained in an outer vessel of glass. Figs. 2ª and 3ª are side views of modified forms of the electrode. Fig. 4ª is a perspective view of a large accumulator constructed according to my invention.

My invention relates to secondary batteries or electrical accumulators. I have found that the action of the battery, whatever may be its form or arrangement, is considerably increased if the electrolytic liquid contains cadmium or tin in solution, owing to the fact that in charging the accumulator these metals are deposited upon the electrode at the negative pole, and during discharge yield a better result than lead or other metals. Cobalt, nickel, or bismuth may also be similarly employed, but with less advantage than cadmium or tin, which are more electro-positive than lead and deposit more readily from acid solutions. These metals may be employed in different forms; but the best results have been obtained with the solutions hereinafter mentioned, in which these metals are contained: Water, nine hundred; sulphuric acid, one hundred; sulphate of tin, three hundred. Water, nine hundred and fifty; sulphuric acid, fifty; sulphate of cadmium, three hundred. With these solutions the metal deposits readily. It is barely attacked at all when the circuit is open, but it is attacked with great uniformity when the circuit is closed. The addition of a little bisulphate of mercury to the above-mentioned liquids renders the action still more regular.

As the action of the electrodes at the negative pole is derived mainly from the tin or cadmium which is deposited in charging, these electrodes may consist simply of conductive plates of carbon, lead, copper, tin, or cadmium, either pure or alloyed with other and less oxidizable metals.

My invention further relates to the construction of the electrodes at the positive pole, which I will describe with reference to the accompanying drawings.

Referring to Fig. 1, a lead support composed of a central rod, C, a number of longitudinal radial strips, A, and a bottom plate, B, is placed in a porous vase, D, as shown in Fig. 3. The spaces between the strips A are then filled with peroxide of lead, or other material capable of producing the same by oxidation, which is mixed with a little water slightly acidulated with sulphuric acid. The longitudinal radial strips of the support may be replaced by spiral surfaces, as shown in Fig. 3ª, or by wires or points like a cylindrical brush, as shown in Fig. 2ª. The electrode thus constituted enables the accumulator to be made in the form of an ordinary battery by placing the porous vase thus prepared in a second vessel, E, of glass, (Fig. 4, for example,) which contains the electrode F of the negative pole. This electrode may be constituted by a simple plate or strip of lead, flat, corrugated, or folded, and surrounds the porous vase D.

For large accumulators, Fig. 4ª, I use water-tight barrels G, in which I place a positive of corresponding dimensions, or several small ones, $c^2$, united together by simple plates of lead, $b$, which surround the positives and form the electrodes at the negative pole, on which the tin or cadmium is deposited in charging. Tin is better suited than cadmium for accumulators with a porous cell, as described; but cadmium is better for those in which the electrodes are immersed directly in the liquid. For the electrode at the negative pole I may employ, in lieu of lead, plates of copper, nickel, or other metal less electro-positive than tin or cadmium, as then these metals are not attacked. I may also use plates of tin or cadmium directly by merely employing water plus two hundred and fifty grams of sulphuric acid per liter, as in that case sulphate of tin or cadmium is formed at the expense of the plates when the battery is discharged.

To increase the duration of the electrodes at the positive pole, I have invented an improvement which consists in protecting a part of the conducting-surface of the electrodes by drawing with an insulating-varnish vertical and horizontal lines two or three millimeters wide and about two millimeters apart. These lines form a reticulated net-work, which is protected from oxidation during a certain time, and which thus increases the durability of the electrode. For this purpose I may use a varnish made with bitumen of India, gutta-percha, or other insulating material. I may also use a solution of platinum chloride in essence of lavender. In this case, the net-work having been traced as above described, the metal is dried and the platinum reduced by submitting the electrode to the positive pole of a battery. The reduced platinum preserves the subjacent metal from oxidation and augments the duration of the electrode. To prevent the tangs of the electrodes from being attacked and the liquids and salts from creeping, as commonly happens, it is only necessary to envelop the tangs in india-rubber tubes which dip just below the level of the liquid.

Having now described my invention, I desire it understood that for the purposes of the invention sulphate of tin and sulphate of cadmium are by me regarded as electro-chemical equivalents.

I claim—

1. In an electric accumulator, the electrolytic liquid containing sulphate of tin in solution, in combination with the electrode of the negative pole with which said liquid is in contact, as specified.

2. The electrode constructed of a central rod, C, of lead, and of surrounding radiating strips A A and lower plate, B, substantially as herein shown and described.

The foregoing specification of my improvements in secondary batteries or accumulators signed by me this 2d day of March, 1886.

ANTOINE EDOUARD PEYRUSSON.

Witnesses:
 JOSEPH M. MURAM,
 LÉON MAURAT.